Sept. 4, 1962 T. PRINS 3,052,380
DEVICE FOR STORING LIQUIDS, MORE PARTICULARLY OIL
Filed June 3, 1960 2 Sheets-Sheet 1
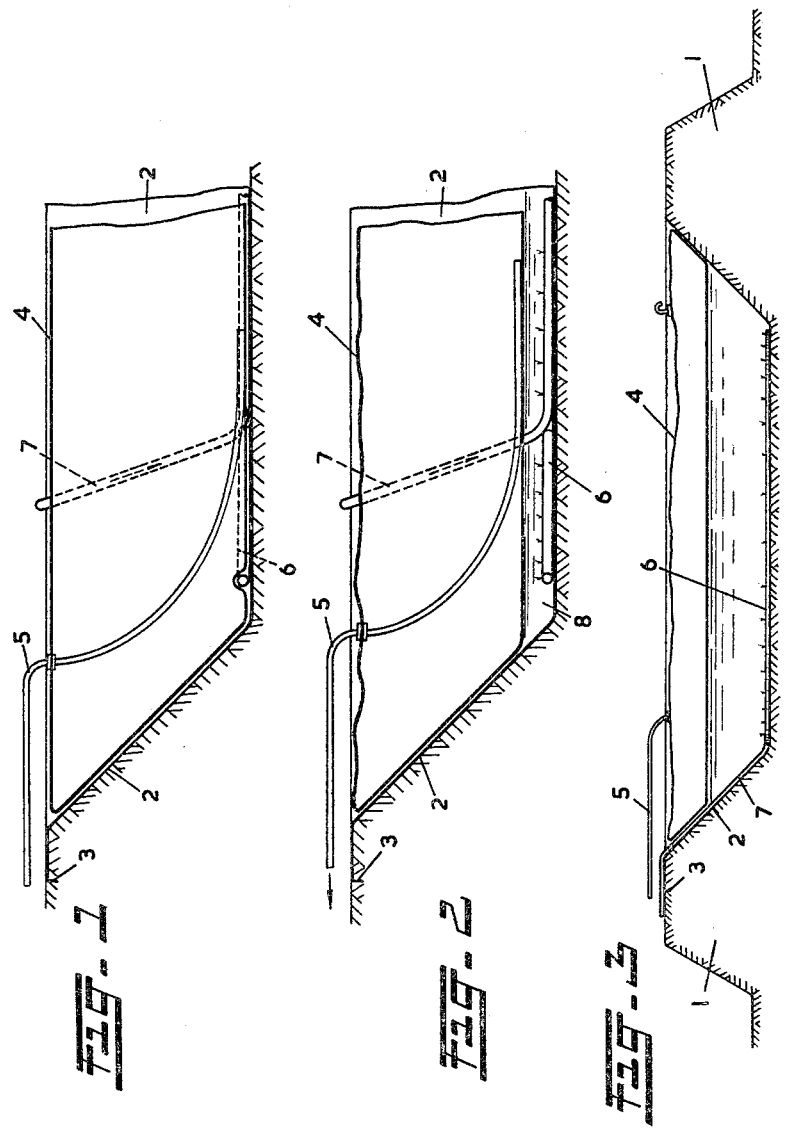
INVENTOR.
THEODORUS PRINS
BY Parrott + Richards
ATTORNEYS Sept. 4, 1962 T. PRINS 3,052,380
DEVICE FOR STORING LIQUIDS, MORE PARTICULARLY OIL
Filed June 3, 1960 2 Sheets-Sheet 2
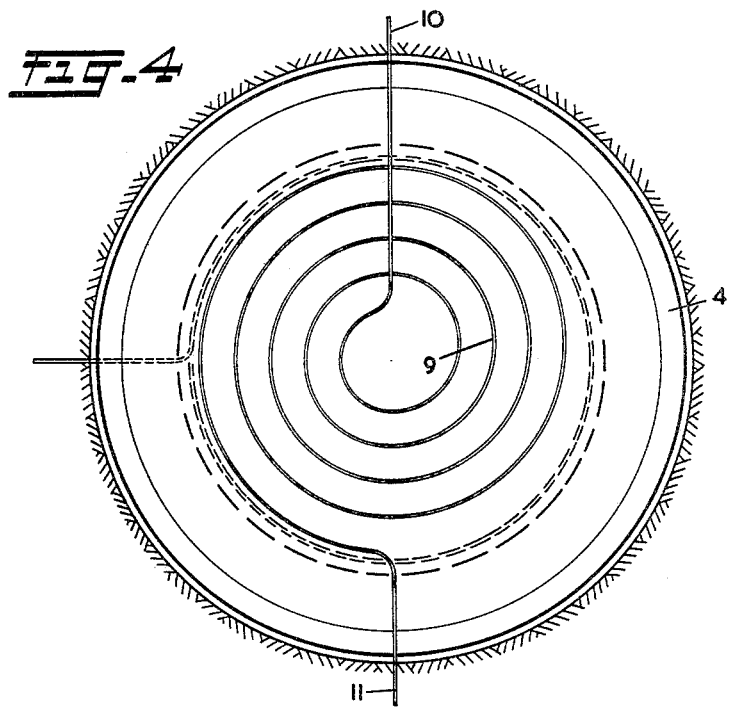
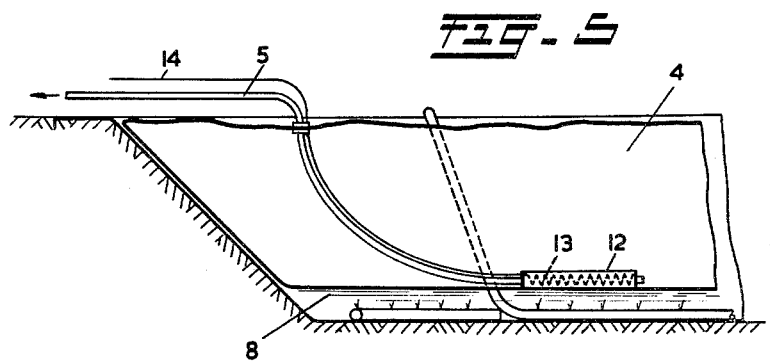
INVENTOR.
THEODORUS PRINS
BY Parrott + Richards
ATTORNEYS

United States Patent Office 3,052,380
Patented Sept. 4, 1962

3,052,380
DEVICE FOR STORING LIQUIDS, MORE PARTICULARLY OIL
Theodorus Prins, B. 167, Sliedrecht, Netherlands
Filed June 3, 1960, Ser. No. 33,719
Claims priority, application Netherlands Feb. 6, 1960
3 Claims. (Cl. 222—95)

For storing oil and products obtained from oil metal tanks that entirely or largely extend above the ground are generally used. Such tanks are relatively expensive and at the same time relatively vulnerable. It regularly happens that oil thus stored gets on fire and such fires mostly do not confine themselves to the contents of the tank in which the fire originated. In most cases either owing to the great heat developed or owing to the burning oil spreading out also adjacent tanks get on fire. In principle it would of course be possible to space the oil tanks farther apart, but this again would be uneconomical because the available area of the terrain would be utilized to a correspondingly smaller extent. In actual practice, therefore, always a large number of tanks are to be found in close proximity to each other in the vicinity of refineries.

The object of the invention is to provide a device in which the oil is stored below the surface of the ground, at least below the surface of the ground immediately surrounding the storing device. This eliminates the possibility of burning oil flowing away in lateral direction. Also the chance of adjacent storing devices getting on fire is substantially reduced, because walls of tanks adjacent a burning tank will not be heated any longer by radiation of heat as was formally the case, which radiation had for its effect that the walls of adjacent tanks broke down in the end.

The storing devices according to the invention moreover have the important advantage that they are much cheaper both as regards their construction and their maintenance.

The device for storing liquids, more particularly oil, comprising a closable envelope consisting of a flexible synthetic material is so formed according to the invention that the envelope which in filled condition has at least substantially the shape of an inverted truncate cone or pyramid, is placed in a complementary hole made in the ground, the bottom and the side walls of which are lined with a water-impermeable lining, made e.g. of a synthetic material, means for the supply and the discharge of water being interposed between said envelope and said lining, said envelope being provided with a filling and drawing-off tube made of flexible synthetic material, which tube extends from the bottom of the envelope and leads out of the envelope.

The device according to the application is so arranged that the means for the supply and the discharge of water comprise an outlet and inlet tube lying on the bottom of the lining, said tube being connected to a supply and discharge pipe leading out of the device.

According to another feature of the invention a heating coil is located on the bottom of the lining, said heating coil being connected to a supply and a discharge pipe for a heating liquid.

According to a further feature of the invention an electric heating element is arranged at the mouth of the filling and drawing-off tube, said element being connected to a source of current by means of leads.

The invention will be illustrated by means of an embodiment which is shown in the accompanying drawing, in which:

FIG. 1 is a partial vertical sectional view of the device according to the invention in an entrely filled condition;

FIG. 2 is a similar sectional view, however, in a position in which part of the stored oil has already been drawn off;

FIG. 3 on a smaller scale shows a vertical section of the entire device in a condition after an appreciable portion of the stored oil has been drawn off;

FIG. 4 is a plan view of a horizontal section of another embodiment of the apparatus, which is characterized in that a heating coil is located on the bottom of the lining;

FIG. 5 is a partial vertical sectional view of yet another embodiment of the device, which is characterized in that it is provided with an electric heating element arranged at the mouth of the filling and drawing-off tube.

In constructing a device according to the invention first a hole is dug in the ground, which hole has a flat bottom and preferably a round periphery. As circumstances demand the excavated ground may either be carried away or this ground may be used for making a bank about the hole dug.

This latter embodiment offers the advantage that the hole to be excavated need not be so deep, while, if the excavated earth is not needed elsewhere, it need not be transported either. The bottom and the walls of the hole thus formed are subsequently lined with a thin lining 2, consisting of a synthetic material, the edge 3 of which lining is folded over and secured in the ground. In the hole thus lined the envelope proper is placed, which envelope 4 is made from a relatively thin flexible synthetic material. This envelope, if it is entirely filled has the same shape as the excavated hole. In the embodiment shown this is the shape of an inverted truncate cone. The envelope is provided with a likewise flexible connecting tube 5, which passes through the upper surface of the envelope 4 and extends down to the bottom of said envelope. On the bottom of the lining in the hole a round perforated tube 6 is located which passes into a supply and discharge pipe 7, which pipe bears against one of the upstanding walls of the hole and leads out of the device. A pumping installation (not shown) is connected to said pipe 7 by means of which installation water can be supplied and discharged respectively. The connecting tube 5 for supplying and drawing off the oil etc. is naturally connected to other installations of the plant.

FIG. 1 shows the device in the condition in which the envelope 4 is entirely filled. The bottom of the envelope 4 then lies flat on the bottom of the lining 2 except naturally in those places where the tube 6 is located. If it is desired to draw off oil, water is supplied through the pipe 7, which water will flow out through the perforations in the round tube 6. A layer of water has formed at 8 in FIG. 2, which means that the bottom of the envelope 4 has been lifted. During the lifting of the bottom of the envelope 4 the oil starts flowing out of the envelope. However, the oil may also be simultaneously pumped away through the tube 5. During the filling of the envelope the same takes place, but in reverse order, so that, therefore, oil is supplied through the tube 5, while the layer of water 8 is pumped away at the same rate, so that, therefore, the bottom of the envelope 4 is gradually lowered until ultimately it bears against the bottom of the lining. The upper side of the envelope will remain at about the same level during all this, so both during the emptying and during the filling, and said upper surface, therefore, will remain flush with the ground surrounding the material.

FIG. 4 relates to another embodiment of the device and it shows a plan view of a horizontal section, which is conceived of as being taken at some distance beneath the upper face of the envelope 4. On the bottom of the envelope 4 there is a heating coil 9 having a supply and a discharge pipe 10 and 11 respectively. The pipes 10 and 11 communicate with a pumping installation, not shown, by means of which water can be passed through the tube 9. The water passing through the tube 9, moreover passes a heating device, likewise not shown, by means of which the water can be brought to a suitable temperature. In this manner it is possible, if desired, to heat the oil in the envelope, if, owing to prevailing low outdoor temperatures has become too viscous, so as to obtain the desired lower viscosity.

Another embodiment of the device, by means of which the same object is achieved is shown in FIG. 5.

The end of the supply and drawing-off tube 5 is surrounded by a heating device 12, provided with a plurality of electric heating elements, schematically designated by 13, the current supplying conductor being designated by the numeral 14.

It will be clear that this heating device may be constructed in all kinds of manners.

Thus this heating device may not be secured to the tube 5, for example, but may be located in the vicinity of the end of said tube. Also in that case the oil sucked through the tube may be brought to the desired temperature.

If the outdoor temperatures are low, it is possible that difficulties will be encountered owing to the layer of water 8 which is supplied in order to expel the oil from its envelope freezing entirely or partly. This possible objection may easily be met e.g. by adding a suitable salt solution or one of the known so-called anti-freezing agents to the water.

Though the storing device described is by no means solely limited to a temporary use, it is an incidental advantage that the device lends itself very well to such a temporary use. Both the envelope and the lining admit of being displaced in a simple manner, whereafter the excavated hole may be filled up, if necessary, which is particularly easy if the excavated earth has been formed into a bank surrounding the hole.

It will be clear that the storing device cannot only be used for storing oil, but also for storing other appropriate liquids.

I claim:

1. A device for storing liquids, such as oil, comprising an envelope for containing liquids, said envelope being made of a relatively light and flexible material and having a top portion, a bottom portion and downwardly and inwardly tapering side wall portions extending between said top and bottom portions, the portions of the envelope being connected together to form a closed container, said envelope resting in a hole in the ground formed with bottom and wall portions shaped substantially complementary to the shape of the envelope for support of the envelope and liquid contained therein, a liner of water-impermeable material positioned beneath said envelope and covering and contacting the bottom and wall portions of the hole and the edges of which liner are secured to the surface of the ground to confine a supply of water in said hole between said envelope and said liner, pipe means for supplying said liquid to and discharging said liquid from said envelope and pipe means to supply and discharge water between the envelope and liner to raise and lower the bottom level of the liquid in the envelope.

2. A device for storing liquid according to claim 1 and characterized further in that the shape of said hole and the shape of the envelope when filled with liquid are substantially the shape of an inverted truncated cone.

3. A device for storing liquid according to claim 1 and characterized further in that the shape of said hole and the shape of the envelope when filled with liquid are substantially the shape of an inverted truncated pyramid.

References Cited in the file of this patent

UNITED STATES PATENTS

| 1,758,984 | Stricker | May 20, 1930 |
| 2,578,864 | Tupper | Dec. 18, 1951 |
| 2,680,802 | Bremer et al. | June 8, 1954 |
| 2,766,907 | Wallace | Oct. 16, 1956 |
| 2,947,437 | Green | Aug. 2, 1960 |

FOREIGN PATENTS

| 976,950 | France | Nov. 8, 1950 |